(12) United States Patent
Wright

(10) Patent No.: US 6,204,847 B1
(45) Date of Patent: Mar. 20, 2001

(54) SHARED VIRTUAL DESKTOP COLLABORATIVE APPLICATION SYSTEM

(76) Inventor: Daniel W. Wright, 390 Elan Village La., #218, San Jose, CA (US) 95134

( * ) Notice: Subject to any disclaimer, the term of this patent is extended or adjusted under 35 U.S.C. 154(b) by 0 days.

(21) Appl. No.: 08/503,453

(22) Filed: Jul. 17, 1995

(51) Int. Cl.[7] ................................................. G06F 13/10
(52) U.S. Cl. ............................................ 345/346; 345/344
(58) Field of Search ........................... 395/620; 709/100, 709/102, 104, 105, 108, 103; 345/340, 344, 342, 346, 332

(56) References Cited

U.S. PATENT DOCUMENTS

| 4,761,642 | 8/1988 | Huntzinger | 340/721 |
|---|---|---|---|
| 4,860,247 | 8/1989 | Uchida et al. | 364/900 |
| 4,896,290 | 1/1990 | Rhodes et al. | 364/900 |
| 4,903,218 | 2/1990 | Longo et al. | 364/521 |
| 5,379,374 | 1/1995 | Ishizaki et al. | 395/155 |
| 5,430,838 | 7/1995 | Kuno et al. | 395/157 |
| 5,442,788 | * 8/1995 | Bier | 395/650 |
| 5,499,334 | 3/1996 | Staab | 395/157 |
| 5,673,403 | 9/1997 | Brown et al. | 395/335 |
| 5,742,778 | 4/1998 | Hao et al. | 395/332 |
| 5,758,110 | 5/1998 | Boss et al. | 395/329 |

OTHER PUBLICATIONS

Prakash et al, DistView:Support for building efficient collaborative applications using replicated objects, CSCW, ACM 1994.* gajewska, Argo: a system for distributed collaboration, ACM1994.*

Smith et al, Access as a means of configuring cooperative interfaces, ACM 1993.*

Lennil P:Demystifying the OS/2 Presentation Manager OS/2 Developer, vol. 5, No. 4, Sep. 1993, pp. 70–79, XP000672965 *p. 70, left–hand column, line 1 –p. 78, left–hand column, line 2 –figures 1–7.

Abe T. et al.: Distributed Cooperative Control for Sharing Applications Based on the Mermaid Multiparty and Multi-media Desktop Conferencing System NEC Research and Decelopment vol. 34, No. 1, Jan. 1, 1993, pp. 122–131 XP000363016 *p. 125, left–hand column, line 13–p. 128, right–hand column, last line; figures 4–7; tables I, II*.

* cited by examiner

Primary Examiner—Majid A. Banankhah

(57) ABSTRACT

A computer system, including a processor, an input device and an output device and that executes an operating system to support the execution, is used to execute first and second sets of application programs. The operating system includes a graphical user interface coupleable through an output driver to the output device and an input interface including an input queue coupleable through an input driver to the input device. 1An environment manager program is also executed by the processor. This program includes a third list of a second set of application programs and a fourth list of application program windows corresponding to the second list of application programs. Execution of the environment manager program provides for the inclusion of the environment manager program in the first and second sets and for selectively swapping with the operating system the first and third lists and the second and fourth lists to switch between the execution of the first and second sets of application programs.

6 Claims, 6 Drawing Sheets

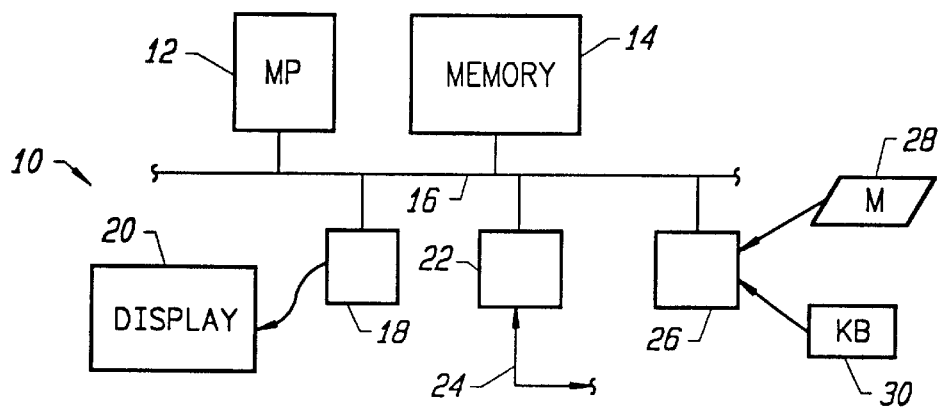
FIG. 1A
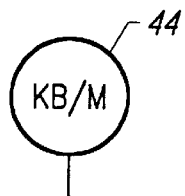
FIG. 1B
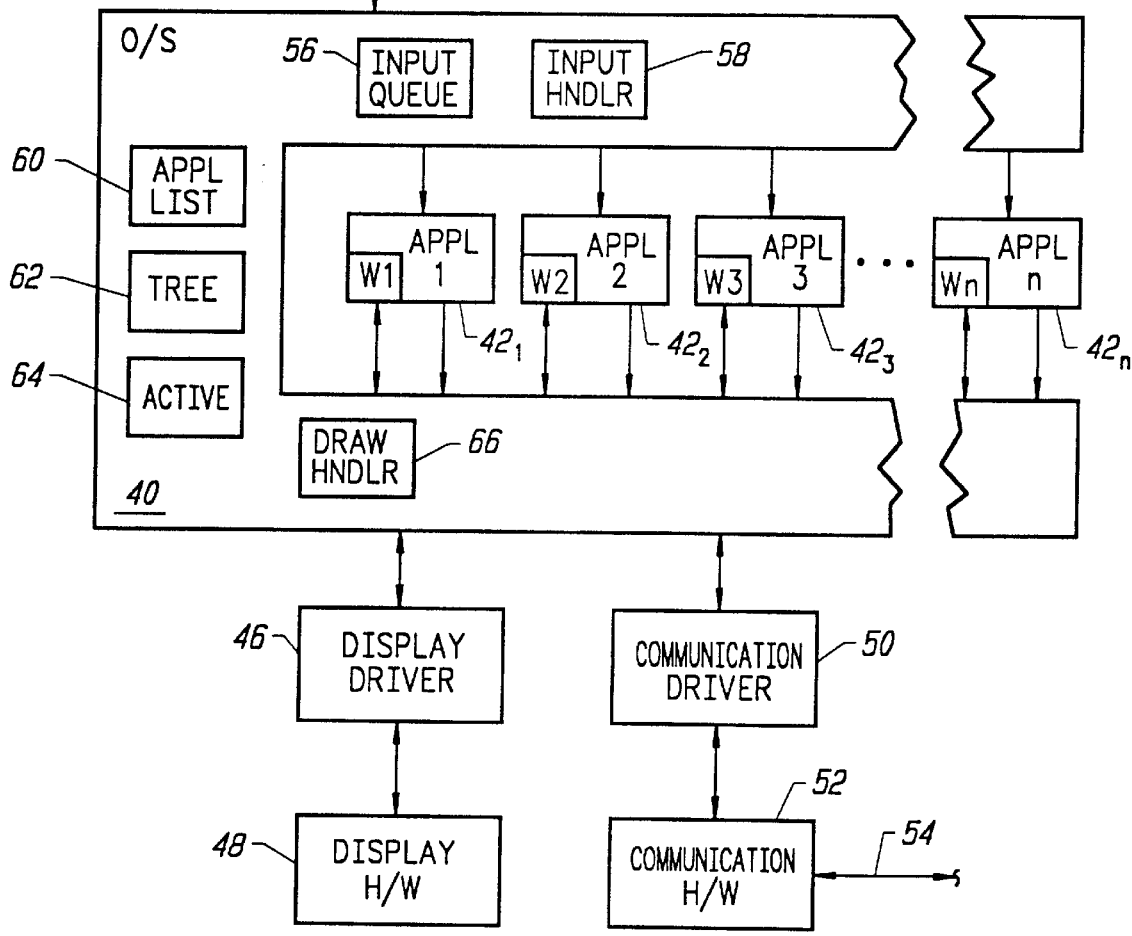

SHARED VIRTUAL DESKTOP COLLABORATIVE APPLICATION SYSTEM

BACKGROUND OF THE INVENTION

1. Field of the Invention

The present invention is generally related to computer systems that provide for the inter-networked simultaneous sharing of information and, in particular, to a collaborative computer application system that provides for a virtual shared application space.

2. Description of the Related Art

With the recent expansion in the variety of information technologies and the distribution of information among network interconnected, or inter-networked computer systems and users, a need has arisen to coordinate the exchange and development of information by users typically at separate and potentially heterogeneous computers systems. In many of these instances, the information that needs to be shared or created requires the collaborative or effectively simultaneous use of some particular application. In many of these instances, the application has been originally designed and implemented to utilize a virtual display window created within and managed by a graphical user interface (GUI) based operating system. Many implementations of such operating systems are well known and include the Apple Macintosh System 7 operating system, the MicroSoft MS-Windows 3.1, MS-Windows 95, MS-Windows NT, and the XWindows system, originally developed at MIT and used in many Unix based operating systems, including SunOS and Solaris.

The virtualization of the display in the form of a window permits some small conventional degree of flexibility in controlling where underlying data and programs are stored, whether an application program is locally or remotely executed and whether the display window or windows utilized by the particular application are locally or remotely displayed. Although these degrees of flexibility are conventionally available, collaborative use of an application program to interactively or simultaneously exchange and create information is not effectively supported. Conventional application programs remain by and large single user tools. As such, these applications co-exists in a networked environment constrained to sharing data through low level record and file locked access to shared data on network accessible storage devices.

Conventional collaborative application programs have been designed and implemented in an effort to support a greater degree of concurrent interactivity. Most conventional collaborative applications are highly proprietary in that the manner and nature of the permitted collaboration is strictly controlled by the particular application. Collaborative interaction is confined to the functions of that application. One manner by which such applications operate is through the establishment of a background server accessible by way of a network connection from each host that will participate in a collaborative session. On each participant host, a user executes an identical copy of the collaborative application. The application itself is responsible for initiating or joining a collaborative session by registering with the background server through a proprietary protocol, though typically overlaid on a conventional protocol such as TCP/IP. Thereafter, for the duration of the collaborative session, the application is responsible for duplicating all collaborative user input to the application and forwarding the copied input to the background server. In turn, the background server is responsible for redistribution of all collaborative input from each participating host to all other participating hosts. Thus, each of the collaborative applications operate from the cumulative set of collaborative user input. Consequently, each application is expected to operate and present information in a synchronized manner.

Proprietary collaborative application programs, while generally functional for their intended purposes, are of limited collaborative value because the collaborative function supported is specifically limited to that of the particular application. Often, the particular requirements of a specific collaborative application program, in order to function as intended, may bar the use of other collaborative applications at the same time by the participating hosts. Furthermore, a high degree of administrative overhead, if not also computer processing overhead, is often required to support collaborative application programs. These costs are additive to the processing and administration requirements of the underlying operating system and networking support required by the application. Thus, collaborative applications have been effective most typically in situations where specialized use and particular functionality have been required.

An alternative to the use of proprietary collaborative application programs is a technology known as screen sharing. This technology provides for the information displayed on the display of a primary or host computer system to be projected across a network to another, or guest computer system. In general, screen sharing is implemented through establishment of a logical tap at the display device driver level of the host computer system. All display data is duplicated by way of this tap and passed through the network to the guest. On the guest system, the screen sharing application executes a logically inverse data tap to display the monitored screen data on the display of the guest.

Screen sharing therefore operates largely independent of the particular applications being executed on the host in addition to the screen sharing application. Screen sharing allows application independence to the point that collaborative sharing of well behaved though otherwise ordinary applications, including applications that otherwise could not be executed on a particular guest system, can be made subject to the collaboration.

Unfortunately, conventional screen sharing effectively precludes the private co-execution of other applications on both the host and all guest systems during the collaboration. All user input on both the host and guest systems is provided to the host executed applications. Thus, the entire function of the host and guest appears synchronized and limited to the collaboration. Consequently, screen sharing is predominately used to allow remote systems to monitor the display oriented aspects of the execution of applications on a single host system.

Another form of computer based collaboration is known as window sharing. In collaborative window sharing, the host system executes an otherwise conventional application within a window established and managed by a proprietary window sharing collaborative application. As with screen sharing, the principal operative feature of window sharing is a tapped duplication of the window display data for transfer to one or more guest systems participating in the window sharing collaboration. Each of these guests also executes the window sharing application, though configured to receive and display the tapped data in a similarly configured window on the guest system. Since a single application is being executed within the logical confines of the shared window, guest input data can also be tapped and provided to the local host at least in a two system collaboration session. If more than two systems are to participate share input data in a collaboration, a significantly more complex registration and input server system is generally required.

The window sharing technology is further constrained in general by the limitation that only a single application can be collaboratively shared within a single window. A collaboration session could be realized through a single window by execution of a succession of applications. To avoid the need to stop and restart applications, multiple windows may be supported by the window sharing application. As expected, the co-execution of applications in respective windows will contend with one another for system resources. However, the execution behavior of the shared applications may be unusual due to the potential of unexpected inputs. A first application may be executed on the host computer system and shared with one or more guests. If the user of that system changes the local input focus to a second window, corresponding to either a private, locally executed application or to another shared application window, the focus event will typically suspend execution of the first application until a focus event within the application's window returns execution focus to the first application. While suspended, the shared application will refuse all input except for a focus event, such as a mouse click within the shared window. Thus, all collaborative guests are suddenly and unexpectedly stopped in the midst of their collaboration.

A shared application focus event may also be generated on any of the guest systems. Consequently, a shared window may be suddenly and unexpectedly raised to active execution on the host by a guest focus event. That is, each time any collaborator at the host or any guest system introduces a focus event into a guest shared window, focus and execution will immediately switch to the shared application on the host and all guests. If multiple shared applications are being coexecuted on the host, the contention for focus will be substantial. Thus, users at the host and guest executing one or more shared applications may be sharply limited if not barred as a practical matter from co-execution of other applications, shared or private. This characteristic of window sharing is, in general, poorly received by the users of such applications.

A combination window and screen sharing technology is also known. This technology provides for the sharing of the full screen on the host. The shared screen is, however, displayed in a window on a guest system. By sharing the full host screen, multiple host executed applications can be shared within a single collaboration session. Input events are mapped on the guest system to be window frame relative for events within the shared window. Consequently, a reasonably operative desk top is represented on the guest in the shared window.

However, the combined window and screen sharing technology inherits most if not all of the disadvantages of the individual screen sharing and window sharing technologies. On the host, no private applications can be executed since the entire screen is shared. While focus events from a guest outside of the guests' shared window will not be shared with the host, all host focus events will generate shared window focus events on a guest. Thus, any activity on the host or through the host from potentially other guests will raise the shared windows of all guests. The ability to execute private applications on the guest systems is therefore largely defeated.

SUMMARY OF THE INVENTION

Thus, a general purpose of the present invention is to provide a virtual shared application space that enables collaborative information exchange.

This is achieved in the present invention by provision of a computer system that executes first and second sets of application programs. The computer system includes a processor that includes an input device and an output device and an operating system executed in support of the execution of programs. The operating system includes a graphical user interface coupleable through an output driver to the output device and an input interface including an input queue coupleable through an input driver to the input device. The operating system also includes a first list of a first set of application programs executable by the processor and a second list of application program windows corresponding to the first set of application programs. An environment manager program is also executed by the processor. The environment manager includes a third list of a second set of application programs and a fourth list of application program windows corresponding to the second list of application programs. Execution of the environment manager provides for selectively swapping with the operating system the first and third lists and the second and fourth lists to switch between the execution of the first and second sets of application programs.

Thus, an advantage of the present invention is that a functional virtual application space is created.

Another advantage of the present invention is that a consistent, complete user environment is created.

A further advantage of the present invention is that the relationship between the shared virtual application space and the non-shared application spaces of inter-networked computer systems mutually inter-operate in well defined and consistent manner.

Yet another advantage of the present invention is that the shared virtual application space maintains an independence from the specific devices that provide input events, provide for display outputs and establish the inter-networking between collaboratively operated computer systems.

A still further advantage of the present invention is that a collaborative environment manager can be provided in the form of an application, device driver, system library or combination thereof to establish a collaborative shared virtual application space fully consistent with the normal operation of a native operating system executed by a given computer.

Still another advantage of the present invention is that the system architecture employed to establish the shared collaborative application space is consistent with the implementation of generic graphical user interfaces, thereby permitting collaborative operation on heterogeneous systems.

Yet still another advantage of the present invention is that the inter-networking communication between collaborative systems is optimized and readily inclusive of incorporating fully collaborative participation by multiple computer systems in the shared application space.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein:

FIG. 1a is a schematic block diagram of a computer system suitable for use with the present invention;

FIG. 1b is schematic block diagram of an event driven operating system supporting a graphical user interface consistent with the utilization of the present invention;

DETAILED DESCRIPTION OF THE INVENTION

Figure 2:
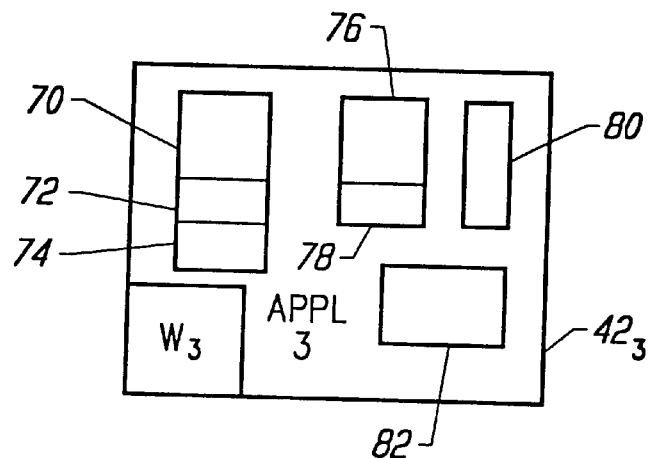
FIG. 2 is a simplified schematic block diagram of the components of a collaborative application environment manager consistent with the present invention.

A computer system 10, as shown in FIG. 1a, is suitable for use in execution of an event driven operating system supporting a graphical user interface appropriate for use in connection with the present invention. The computer system 10 includes a microprocessor 12 for executing an operating system and one or more application programs stored in a memory system 14 and accessible by way of an interconnecting data and control bus 16. Display information is processed through a display controller 18 for rendering on a display 20. Inter-networking communications data is processed through a network interface controller 22 to a network 24. A minimum, though presently preferred, implementation of the interface controller 22 is as a standard serial port providing an inter-networking path over a point-to-point serial path 24. The preferred serial connection, along with the relative simplicity of selecting particular guests for collaboration, is preferred as fully sufficient for collaborative sessions established with the use of digital simultaneous voice and data (DSVD) modems. The interface controller 22 may also be an ethernet or similar local area network (LAN) adapter providing for connectivity to a conventional ethernet network 24. Finally, an input interface controller 26 is provided to receive input data typically from a mouse 28 and a keyboard 30. The interface controller 26, as in many conventional implementations, includes a serial port and a dedicated keyboard controller.

Conventional computer systems generally sufficient to provide the basic system requirements of the computer system 10 include personal computers based on the IBM AT architecture and derivatives thereof, Apple Macintosh and PowerPC computers, and Sun SparcStations, among others.

Referring now to FIG. 1b, a representative diagram of an event driven operating system 40 supporting a graphical user interface (GUI) is shown. The operating system 40 provides both input and output control services for a number of applications $42_1$–$42_n$ that are executed by the computer system 10 with the support of the operating system 40. Characteristic of the operating system 40 is that input data is received and stored by the operating system as discrete events in an input queue 56. As events, each input datum is stored in the input queue with an effective identification of the data source and the data destination. The data destination information may be subsequently utilized by the operating system 40 to release the data to the appropriate application $42_1$–$42_n$ for which the data is intended.

An input handler routine 58 is typically provided as a part of the operating system 40 to manage the receipt of input data and to appropriately store the data in the input queue 56. The input handler executes typically in response to the receipt of a hardware interrupt generated coincident with the receipt of input data. The input handler 58, in turn, obtains the input data, creates an identifier as to the source and destination of the data, and stores both as an entry in the input queue 56. Each entry in the input queue 56 is, in the preferred embodiment, a list element in a linked list data storage structure or equivalent.

The operating system 40 also preferably contains a data structure 60 that provides slotted entries for each of the applications $42_1$–$42_n$ that have been launched for execution with the support of the operating system 40. Each of the slotted entries in the application list 60 contains identifying information locating each of the applications $42_1$–$42_n$ within the address space of the operating system 40. The slotted entries also store other information as may be required by the operating system to establish and maintain the memory space and effective execution state of each application. A slotted entry in the application list 60 is typically allocated or initialized upon launch of a new application. As the application is loaded into memory within the address space of the operating system 40, memory is allocated based on the memory space requirements of the application. Appropriate identifiers for this information are entered into the slotted entry for the application in the application list 60. Once loaded, state information also typically stored in the slotted entry is initialized to identify the application as ready to run.

When an application is terminated, the corresponding memory space identifiers are utilized to release the memory occupied by the application for subsequent use by the operating system 40. The entry in the application list 60 is either deleted or marked as unused.

Typically, a dynamically allocated hierarchical or tree structured window list is utilized by the operating system 40 in management of the windows $W_1$–$W_n$ that are opened upon request by the applications $42_1$–$42_n$. The windows $W_1$–$W_n$ are, in the preferred embodiment, allocated within the address space of the respective applications $42^1$–$42_n$ and initialized with a logical representation of a window display. The window memory is allocated in response to operating system calls made by the executing application through the application program interface (API) of the operating systems 40. Other calls can also be made by the application to specify various window decorations and to establish callbacks to the application upon user manipulation of the associated window decorations With each call to create a window, the operating system 40 adds a list entry to the tree structured window list. The logical root of this window list is the desktop or root window of the operating system 40. Typically, a single word of data, utilized as a pointer to the root window list entry of the tree structured list, is stored in a root window pointer location 62. The root pointer is initialized to point to a root window list entry. The root window entry, like all other tree structured window list entries, typically includes structure links sufficient to allow a linked list type traversal of the tree structured window list by the operating system 40. Traversals of the window list are performed by the operating system 40 to determine window boundaries and visibility in connection with display update events, for example.

Each entry in the window list also provides storage for a pointer reference to the base of a window memory space $W_1$–$W_n$ existent within a corresponding application $42_1$–$42_n$. Thus, as each application window $W_1$–$W_n$ is created, additional window list entries are allocated and linked below the root window to form the tree structured window list. By the ordered linkage of the entries, a hierarchical relation is established representing the desired display window hierarchy over the root or desktop window.

Another data word is separately stored by the operating system 40 in an active window pointer location 64. The pointer reference stored in the location 64 may be a pointer into the application entry list 60 or directly to a particular application in memory. This referenced application is identified as the currently executing foreground application. As such, the application is also the one application that currently has the input focus of the operating system 40. Any other applications may continue to effectively execute in the background as supported by the operating system 40, at least until user input is provided. In general, the application that is executing within the window with input focus receives normal keyboard and mouse input data. Events that are specified to change the input focus, such as a mouse click in another window, may shift the input focus to another window and therefore direct input to another application. With each change in input focus, the pointer stored in the active window pointer location 64 is correspondingly updated to reference the new active foreground executing application.

Finally, the operating system 42 preferably provides for the storage of a drawing routine table 66. This table 66 is utilized as a jump table permitting integration of a device specific display driver with the virtual display drawing operations internally supported by the operating system 40. In the preferred embodiment, an executing application $42_1$–$42_n$ may issue an series of virtualized API drawing command calls to the operating system 40. These calls are generally intended to direct the operating system 40 to make corresponding modifications to the contents of a the window of the requesting application. Where the display area of other windows may be affected by the requested window modifications, as may be determined from a traversal of the window list, update events are queued for the applications owning the affected windows.

The operating system 40 processes each of the virtualized drawing commands into a series of one or more well-defined atomic drawing operations. These atomic operations are implemented by sub-routines within a device driver 46 and are intended to incorporate the hardware specific drawing and display functions of the display hardware 48. In order to integrate these atomic drawing routines into the function of the operating system 40, the drawing routine table 66 is used to store execution jump pointers to the individual display controller specific sub-routines 46. The table 66 is initialized with these jump addresses upon the original loading and initialization of the display driver 46 by the operating system 40. Thereafter, the atomic drawing commands are accessed through low level API calls by the operating system 40 to physically reflect the logical state of the data stored within the window address space $W_1$–$W_n$ of the originally requesting application $42_1$–$42_n$.

The display driver 46 drawing commands perform corresponding drawing operations on the provided display data. The resulting bit map representation of the display data is written to the video buffer space present on the display hardware 48. The display data is provided by the operating system 40 as needed to maintain the currency of the logically visible portions of the windows $W_1$–$W_n$. That Is, applications will process display update events or other events that ultimately require the updating of a portion of the display to reflect an exposure of a portion of a window or to change the display contents of a window. In either instance, the operating system 40 is called upon by the applications $42_1$–$42_n$ to cause operating system 40 to issue a series of atomic drawing commands. The commands issued and data associated with the commands is determined in part by a partial or complete traversal of the tree structured window list whose root is currently pointed to by the tree root pointer 62. As the tree structure is traversed, the visible portion of the windows $W_1$–$W_n$ are determined by the operating system 40 and transferred by execution of atomic drawing commands to the video buffer memory on the display hardware 48.

Finally, for purposes of the present invention, a communication driver 50 is preferably provided in conventional connection to the operating system 40. The communication driver 50 and associated communication hardware 52 may be implemented as a simple serial data sub-system or as a more complicated local area network sub-system. In the preferred embodiment of the present invention, the communication driver 50 is implemented as a serial port driver routine and the communication hardware 52 is a conventional serial port. Thus, the external data connection 54 represents a point-to-point serial link connecting the system 38 to a second computer system 10' also executing a functionally equivalent system 38'. The operating system 40 may be called by an application $42_1$–$42_n$ to establish a logical connection between the application and the serial port drive routine. This data received by the serial port communication hardware 52 is routed by the operating system 40 to the application $42_1$–$42_n$ typically through a data queue dedicated to the port.

Alternately, the communication driver 50 may include a PC-TCP/IP stack with an appropriate data link layer for managing the operation of an ethernet network interface adapter 52 or token ring network interface adapter. The network 54 can thus provide for the interconnection of one or more other computer systems 10' each executing a local copy of the system 38'. Again, the operating system 40 provides a logical relation between the application and the communication hardware 52, further augmented by the use of internet protocol (IP) addresses or the like. Thus, received network data is routed through a dedicated network data queue to the correct destination application $42_1$–$42_n$.

The system 10' may also be constructed with a quite different hardware architecture and execute a different operating system 40' so long as the systems 38, 38' are logically consistent in their implementation of present invention.

Referring now to FIG. 2, an environment manager application $42_3$ appropriate for execution within an environment supported by the event driven operating system 40 is shown. The environment manager application $42_3$ incorporates a number of data structures and support sub-routines appropriate to implement a preferred embodiment of the present invention. The environment manager application $42_3$ includes an alternate or covert application list 70 equivalent in logical structure to application list 60, an alternate storage location 72 for storage of a root window pointer to an alternate tree structured window list, and in an alternate active window storage location 74 for storage of an alternate active window pointer. The environment manager application $42_3$ further includes an alternate input queue 76 and a modified input queue handler routine 78. Finally, the application $42_3$ includes an alternate drawing routine jump table 80 and a covert environment device driver 82 containing an alternate set of welldefined atomic drawing routines. The entry points for these alternate atomic drawing routines are stored in the conventional sequence in the alternate jump table 80.

The purpose of the alternate data structures and routines provided as part of the environment manager application $42_3$ is to permit, in general terms, a swapping of the original or overt structures and routines with the alternate or covert structures and routines on a dynamic basis to switch the global context of the operating system 40 between a overt environment involving the execution of one set of applications and a covert environment involving the execution of a second set of applications. The overt environment applications execute within the normal environment of the operating system 40 as conventional private or entirely locally executed applications on the host 10. The covert environment applications are also executed on the host 10 as local applications, but subject to environmental modifications that enable the sharing of input events and atomic display commands among any number of collaborative guests 10' and the host 10. That is, in combination with the swapping in of the covert data structures and routines, local or server input events as well as remote or guest input events from the collaborative guests 10' are collected and provided as input events to the applications in the covert environment. At the same time, all atomic drawing commands are directed to the covert display device driver 82 which is specifically modified to utilize the memory space of the environment manager application window $W_3$ as a display data buffer for the covert environment display. The root display space of the covert environment is thus presented within the overt environment as the displayed contents of environment manager application window $W_3$.

The atomic drawing commands are also forwarded by operation of the covert display driver through the environment manager 42 and operating system 40 to the collaborative guests 10' to correspondingly update a client collaborative application window $W_3$'. That is, the environment manager applications $42_3$ of the collaborative guests 10', upon establishing a serial or network connection with the host 10, configures a client collaborative application window $W_3$'. All input events in this window $W_3$' are forwarded through the environment managers $42_3$' and operating system 40' over the network 24 to the host 10. All atomic drawing commands forwarded by the host 10 are, in turn, applied by the environment managers $42'_3$ to the operating system 40' to update the contents of the client collaborative application window $W_3$' on the collaborative guests 10'.

Figure 3:
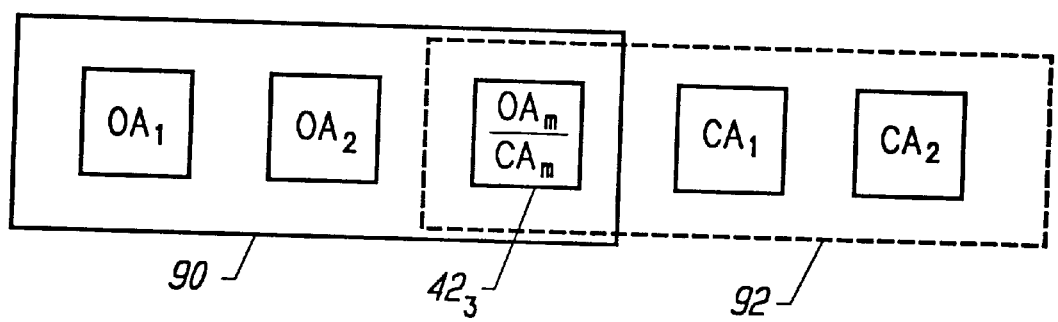
FIG. 3 provides a simplified block diagram illustrating the establishment of overt and covert operating environment and shared participation in both by the environment manager application of the present invention.

As schematically indicated in FIG. 3, a preferred embodiment of the present invention particularly suited for execution in an MS Windows 3.1 operating system environment provides for an overt environment 90 and a covert environment 92. The overt environment 90 may include any number of executable applications $OA_1$–$OA_N$. Likewise, the covert environment 92 may include any number of covert executable applications $CA_1$–$CA_N$. The total number of overt and covert environment applications are naturally limited by the total application space supported by the operating system 40.

As shown in FIG. 3, for operating systems 40 that support cooperative multi-tasking such as MS-Windows 3.1 and Macintosh System 7, an application embodying the present invention is provided to execute in both the covert 90 and overt 92 environments. Thus, at each opportunity for the shared application $42_3$ to execute, a switch between the overt and covert environments may be implemented. Preferably, a timer event is established to ensure that the shared application $42_3$ is periodically scheduled to execute.

In a generally preemptive operating system environments, such as provided by MS-Windows '95, operating system task switch notification can be utilized to directly execute a portion of the shared application $42_3$ on each task switch. Thus, with each task switch, a switch can be made between the overt and covert environments as needed. In other operating systems, including MS-Windows NT and Unix based operating systems that substantially support true preemptive execution of applications, standard system services may be utilized to directly invoke execution of the environment switching portion of the shared application with each context switch implemented by execution of the system scheduler.

Figure 4:
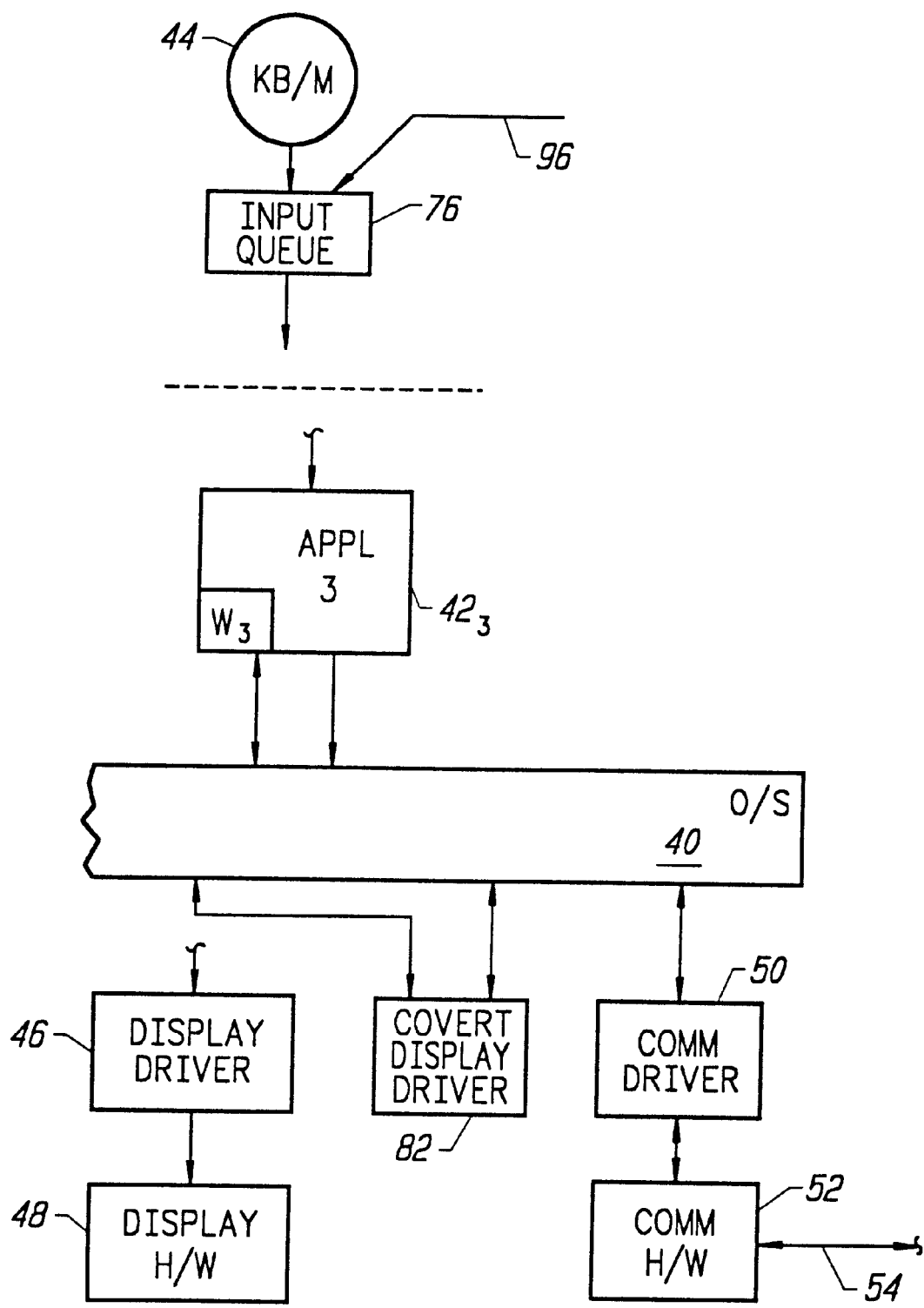
FIG. 4 provides a schematic block diagram illustrating the implementation and operation of the present invention in establishing the covert display environment.

FIG. 4 generally shows the preferred reconfiguration of the operating system 40 when supporting application execution in the covert environment. The alternate input queue 76 is effectively swapped for the overt input queue 56. Since the input queues 56, 76 are data storage structures, the contents of the queues 56, 76 are preferably exchange copied on entry and exit of the covert environment. The modified input handler routine 78 is logically installed in place of the input handler 58. Unlike the other alternate data structures and routines, the modified input handler 78 remains resident for the duration of the execution of the environment manager application $42_3$. That is, the modified input handler 78 manages the input queues 56, 76 in both the overt and covert execution environments for so long as a covert environment exists. This allows the modified input handler 78 to recognize and handle input data for both the overt and covert environments regardless of which environment is currently being supported by the execution of the operation system 40. Also, in order to simplify the implementation of the present invention, the input handler 58 is preserved and used as a dedicated substantive of the new handler 76.

The display driver jump table 80 is exchange copied with the drawing jump table 66 on entry into and exit from the covert environment. Consequently, during execution within the covert environment, operating system calls are directed through the drawing routine jump table 80 to the covert display driver 82. All conventional applications executing within the covert environment are therefore provided with the full services of what appears to those applications as a conventional display driver.

In accordance with the present invention, the covert display driver 82 differs from a conventional display driver in that the memory space of window $W_3$ of the environment manager application $42_3$ is utilized as a bit map based display data buffer. That is, all window update events within the covert environment are ultimately realized by the execution of atomic drawing commands executed against the bit map memory space stored in the window $W_3$. The contents of the window $W_3$, when transferred as a direct bit map in response to an update event against the overt environment window $W_3$, properly displays the hierarchial arrangement of windows within the covert environment within the frame of the window $W_3$ on the display 48.

The covert display driver 82 also differs in that the driver 82 provides for a duplication and forwarding of all atomic display commands to the operating system 40 effectively via the environment manager application $42_3$. Consequently, the commands as ultimately forwarded to the operating system 40 preferably includes a logical identification of each collaborative guest 10' that is to receive the copied atomic display command.

Finally, the covert display driver 82 differs in that an update event is generated and provided to the overt environment input queue 58 when the content of the covert display window $W_3$ is changed. Thus, when the environment manager application $42_3$ swaps back to the overt environment, the relatively conventional sequence of processing of outstanding update events by the environment manager application $42_3$ in the overt environment context will result in an efficient updating of the overt environment window $W_3$ to the display 48.

Figure 5A:
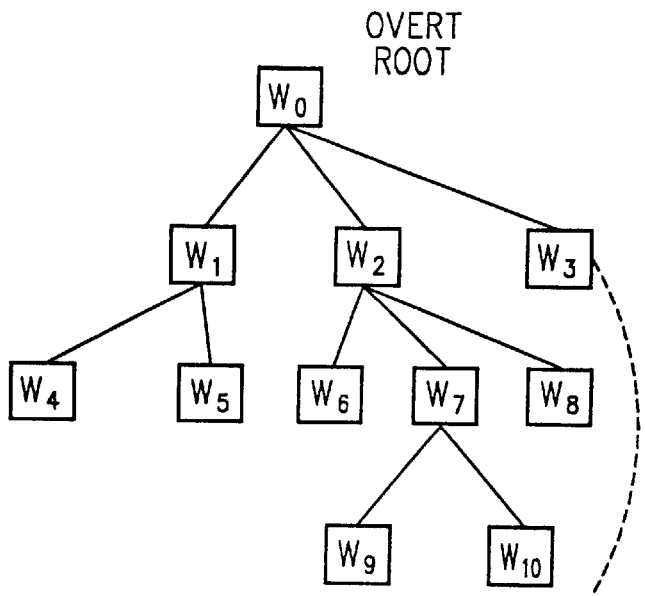
FIGS. 5a and 5b provide graphical representations of the relationship between the overt and covert windows established by the environment manager of the present invention.
Figure 5B:
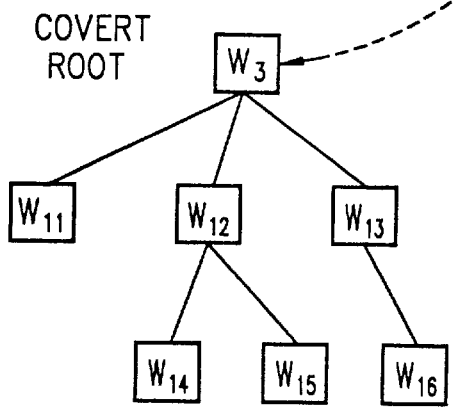
Figure 5B:
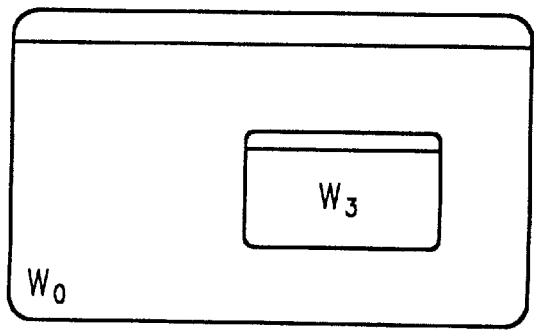

The relationship between the overt and covert environments in terms of root window displays is illustrated in FIGS. 5a and 5b. In FIG. 5a, a root window list entry represents an overt environment root window $W_0$. A number of heirarchially related overt application windows $W_1$–$W_{10}$ are further represented as window list entries linked beneath the root display list entry. In general, each application is responsible for updating the representation of its window to the root display window. The need to update a particular window occurs in response to the execution of the application that owns the window or the execution of another application that results in, for example, the exposure of some part of the window. Updates of a window by the owning application are typically implemented through the generation of drawing events directed to the operating system. Updates due to the execution of other applications typically result in the generation of update events for the applications of the affected windows. Upon execution, applications typically check for and acquire outstanding events awaiting processing by that application. Update events are generically handled by applications through the generation of drawing events for at least the affected portion of the application window.

Whenever a drawing event is logically directed against a particular one of the dependant windows $W_1$–$W_{10}$ by an application, the window memory is correspondingly modified. If the modified portion of window is logically visible, atomic drawing commands are issued to render the modification, in bit map form, in a corresponding portion of the display data buffer.

The environment manager application, when executing in the overt environment, consistently responds to update events for the window $W_3$ to display the contents of the window $W_3$ on the root window $W_0$. Since the contents of the window $W_3$ exists as a bit map, the update is a bit map transfer of the affected portion of the window $W_3$ to the display data buffer. The window $W_3$ therefore appears in the overt environment as a conventional window, generally as represented in FIG. 5b.

The content of the environment manager application window $W_3$ is determined by the applications that execute within the covert environment. When the operating system 40 is executing in the covert environment, the application list 60, the tree structured window list pointer 62 and active window pointer 64 are exchange copied with the alternates 70,72,74 stored in the environment manager application $42_3$. The root entry of the window list during covert environment execution therefore corresponds to the window $W_3$. The initial application executing in the covert environment is the environment manager application $42_3$. Thus, the initial application list 70 includes only the environment manager application $42_3$. The pointer in the active application storage location 72 initially points to this application.

Again referring to FIG. 5a, as applications are subsequently launched and begin to execute in the covert environment, window list entries are created for the windows $W_{11}$–$W_{16}$ corresponding to the covert applications. As each covert application window is created, manipulated and destroyed, drawing and update events are generated and processed by the covert applications. The covert applications directly or indirectly call the covert display driver 82 with the result that the covert root window $W_3$ is correspondingly updated.

Each time execution switches from the covert to the overt environment, the content of the covert root window $W_3$ properly reflects the visible state of the covert environment application windows. Since a single input queue handler routine 78 executes in both overt and covert environments, thereby retaining knowledge of both input queues 56, 76, a covert environment update event can be effectively issued for the environment manager application $42_3$ pending a switch to execution in the overt environment. When the overt environment update event is handled, the environment manager application $42_3$ correspondingly updates the appropriate visible portion of the covert root window $W_3$ into the overt window $W_3$ on the overt root display $W_0$.

Figure 6:
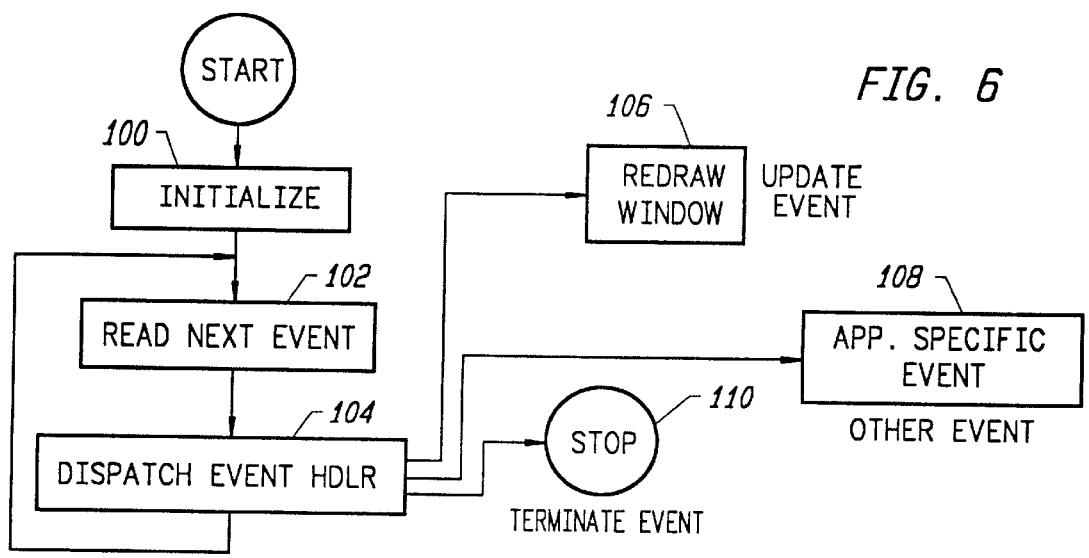
FIG. 6 provides a flow diagram illustrating the relevant coercion of the event manager of an event driven operating system consistent with the present invention.

Referring now to FIG. 6, a flow chart illustrating the conventional initial flow of operation in an application consistent with the present invention for a cooperatively multitasking operating system is shown. When an application has been loaded by the operating system 40, a start event or equivalent is associated with the application. Until the start event is processed by the operating system 40, the application remains loaded in memory in an effectively suspended state. Generally at the first available opportunity, the start event is processed by the operating system and an initialization routine 100 of the application is executed. The initialization routine 100 performs whatever functions are necessary to initialize the application including, as appropriate, the creation of a window data space and the issuance of requests to establish a predetermined set of window frame decorations, such as pull-down menu lists and scroll bars. Once the application has been initialized, execution passes to a read next event routine 102. This routine 102 executes an operating system call that waits on the existence of an input event from the input queue 56 specific to this application. When the operating system 40 determines that such an event exists and should be processed by the application, the operating system call returns with the input data and execution continues with the dispatch event handler 104. The type of input event is determined by the dispatch event handler 104 and an appropriate sub-routine within the application is called. These sub-routines include basic operations such as redraw window 106 which are utilized to handle standard update event inputs as well as other sub-routines specific to the particular function of the application, as illustrated generically by the application specific event routine 108. Another standard event that is dispatched by the dispatch event handler 104 is a terminate event, which is processed by a stop routine 110.

Figure 7:
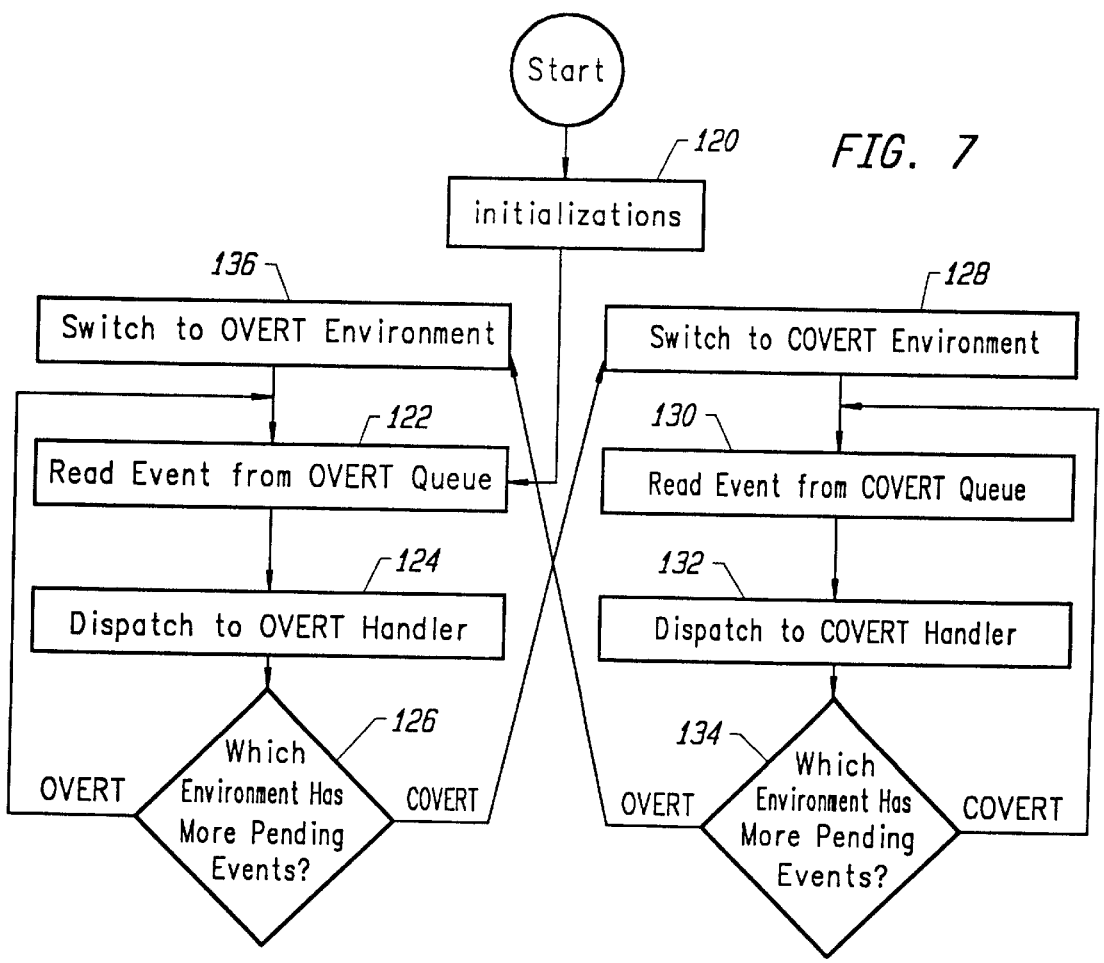
FIG. 7 provides a flow diagram illustrating the modified event handling loop for the overt environment and a single covert environment in accordance with a preferred embodiment of the present invention.

The corresponding operation of the present invention for cooperatively mutlitasking operating systems is generally shown in FIG. 7. Upon start of the environment manager application, the initialization routine 120 is executed. The initializations performed include the following steps:

1. Request allocation of memory space for an alternate input queue structure. Initialize the structure to a clear or empty state.
2. Request allocation of memory space for a pointer to an alternate tree structured window list.

3. Request allocation of an alternate current active window pointer storage location.
4. Request allocation of an alternate applications list structure. Initialize the application list structure to a clear or empty state. Insert an initial entry into the application list referencing the Environment Manager application. Insert a pointer to this application in the alternate current active window storage location.
5. Execute an operating system call to allocate memory for a covert environment window. Initialize the memory space to represent a predefined background pattern. Request allocation of memory space for a root window list entry and establish a pointer stored in the alternate tree structured window list pointer storage location. Initialize the root window list entry.
6. Execute operating system calls to establish window frame decorations for an overt environment window.
7. Execute operating systems calls to add menu items to the overt environment window frame to establish links to executable features of the environment manager, including an application selector and launcher for selecting and launching an application in the covert environment (desktop rules may also be implemented at the system configuration level to support the drag and drop of application icons onto the environment manager window to launch the application).
8. Replace the input handler routine with the alternate handler routine provided as part of the environment manager application.
9. Execute an operating system call to establish an operating system alarm for periodically generating a timer event directed to the environment manager application.

Execution then continues with the execution of the read event from overt queue step 122. This results in the execution of an operating system call that waits on the existence of an input event in the input queue destined for the environment manager application. The timer event established as part of the initialization routine 120 guarantees that a periodic event will exist for the environment manager application.

When an event exists for the environment manager application, execution continues with the dispatch to the overt event handler routine 124. The expected events, in a preferred embodiment of the present invention, include timer events, menu selection events, character input events, a termination event and other events related to the manipulation of the window frame and decorations. A combination of menu choice and character input events may be utilized to select an application for launching within the covert environment. When an application is launched in this or an equivalent manner, the application is loaded under the control of the environment manager application into the memory space of the operating system 40 in a suspended state. That is, upon loading the application is added to the application list for the covert rather than overt application list. Consequently, the application will be initialized and begin execution exclusively within the covert environment. Preferably, the operating system top of memory value is used in defining the loading address of the application. Further, this value is preferably stored separate from the application lists and is not modified merely as a consequence of a switch between the overt and covert environments.

A terminate event is also handled by the dispatch to overt handler routine 124. The terminate event causes execution of a terminate routine that provides for the restoration of the input queue handler routine 58. A final copy exchange, as needed, of the various data structures and routines is then performed. Finally, the resources allocated to the environment manager application and any covert applications upon initialization or through execution are released back to the operating system 40.

When the environment manager application receives a non-terminal overt event from overt queue, execution passes to a decision point routine 126 to determine whether to switch between the overt and covert environments. This decision is made based upon the relative number of pending events in the overt and covert input queues 56, 76. Where the overt queue 56 has the larger number of pending events, execution continues with the read event from overt queue routine 122.

However, if the covert queue 76 has the larger number of pending events, execution continues with a switch to covert environment routine 128. This routine 128 provides for the copy exchange of the application lists 60, 70, pointers to the tree structure window lists 62, 72, and active window pointers 64, 74. The contents of the window queues 56, 76 are also copy exchanged. Finally, the drawing jump tables 66, 80 are copy exchanged to complete the switch to the covert environment. Execution then continues with a read event from covert queue routine 130.

In executing within the covert environment, a very small number of potential events will be directed to the environment manager. All events associated with the window frame decorations and menus will be generated within the overt environment. Focus events exist for the windows of applications executing within the covert environment. However, the window of the environment manager application is, in effect, the root display of the covert environment. Thus, no covert environment focus events directed to the environment manager are expected. However, timer events continue to occur. The request for periodic timer events made during the execution of the initialization routines 120 remains with the operating system 40 independent of whether the operating system is executing in the overt or covert environments.

Execution then passes with the event obtained by the read event from covert queue routine 130 to the dispatch to covert handler routine 132. Once an appropriate handler routine has been called and executed, execution then continues to a decision point routine 134. As with the routine 126, the decision point routine 134 determines which input queue has the greater number of pending events. If the covert queue 76 has the greater number of pending events, execution continues with the read event from the covert queue routine 130. Conversely, if the input queue 56 has the greater number of pending events, execution continues with a switch to overt environment routine 136.

The switch to overt environment routine 136 performs substantially the same function as the switch to covert environment routine 128. The various data structures are copy exchanged between the operating system 40 and environment manager application 42_3. The switch to overt environment routine 136 may enter an update event into the overt input queue 56 for the window corresponding to the environment manager application. Whether this update event is entered depends on whether the covert environment modified any visible portion of the covert root display window $W_3$. This update event will typically be the next event read from the overt queue by the read event from overt queue routine 122. When read, the event will invoke an update of the environment manager application window to the root window of the overt environment. Thus, updates made to the covert root window due to the execution of applications in the covert environment will be properly reflected in the environment manager application window $W_3$ upon or shortly after a switch is made back to the overt environment For the case of a preemptively multi-tasking operating system, or at least where the operating system provides a task switch notification event, the operation of the present invention may be substantially simplified. Rather than requiring the environment manager application to be scheduled and executed as an ordinary application, the environment switching routines provided by the environment manager application can be effectively registered with the operating system and invoked automatically by the operating system in response to each task switch implemented by the operating system. In this case, the initializations described above are performed as part of the initialization of the environment manager application. However, a second applications list is not required. All applications remain visible at all times to the operating system. However, the environment manager tracks which applications are in the overt and covert environments based on the environment in which the application is launched. Specifically, applications launched into the covert environment are launched with the support of the environment manager and can thus be identified as covert environment applications. All other applications are overt environment applications. Thus, upon a task switch to a new task, the environment switching routines of the environment manager are executed. If the application of the task that is the target of the task switch is in a different environment, then data structures are exchange copied as appropriate to switch to the overt or covert environment. No decision as to which environment has the largest number of pending input events, since all input events result in the flagging of corresponding applications as ready to run. By the use of the single application list, the scheduler will properly select applications from both environments to run in a prioritized order.

Figure 8:
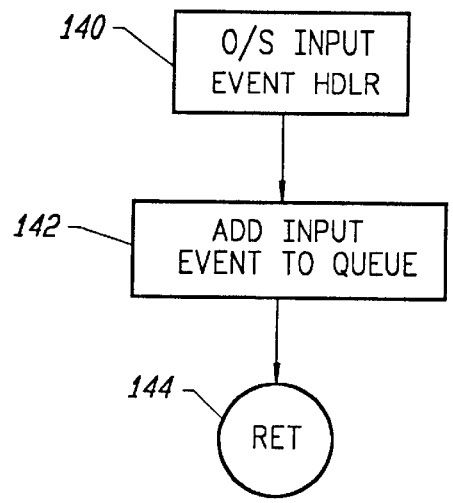
FIG. 8 provides a detailed flow diagram of the input event subsystem of an event driven operating system consistent with the present invention.

A flow diagram illustrating the function of a standard input handler routine 58 is shown in FIG. 8. As illustrated, an operating system input invent handler sub-routine 140 is responsible for performing the interrupt handling or other low level functions necessary to acquire input data provided via a keyboard or mouse 44 or from a communications driver 50 coupled to the operating system 40 as represented by the logical data path 96. This input data is then passed to an add input event to queue routine 142. In the case of simple character input, the intended destination of the input event is the currently active window, determinable from the active window pointer 64. In general for a mouse event, the operating system input focus is changed to the top most window under the mouse pointer at the point of the mouse event. The active window pointer 64 is updated appropriately. Concurrently, an update window event and any other events bound to the mouse event may be created. Each of these events are added to the input queue 56 with the logical destination identified as being the current active window. Execution is then returned to the operating system at 144 as appropriate to allow resumption of the execution of the interrupted application.

Figure 9:
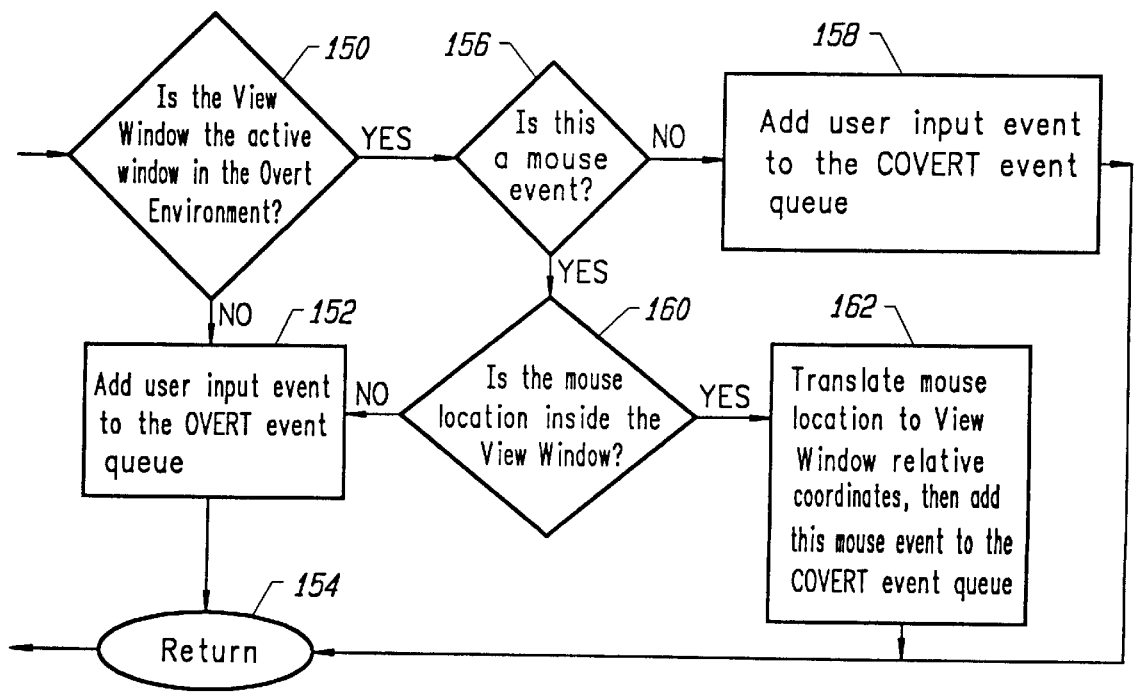
FIG. 9 provides a flow diagram illustrating the modified input handling routine implemented in accordance with the preferred embodiment of the present invention.

In accordance with the present invention, a new add input event to queue input handler 142 is provided as the handler routine 78 to enable management of both the overt and covert event input queues 56, 76. As shown in FIG. 9, an initial decision point determination is made 150 as to whether a new input event is associated with the overt or covert environment. The current active environment, overt or covert, is maintained in a global state variable at all times by the environment manager application. Thus, the active window in the overt environment can be correctly identified from one of the active window pointer storage locations 64, 74, regardless of whether the overt or covert environment is active at the time of the input event.

If the current active window in the overt environment is not the environment manager application, the input event is added to the overt input queue 56 at 152 and execution is returned to the operating system at 154. In a preferred embodiment, the event is added to the overt queue 56 under control of the input handler routine 78 and specifically through execution of the handler routine 58. That is, the input handler routine 78 executes to swap in, as necessary, the various data structures appropriate for the overt environment. The input handler 58 is then called to insert the event into the overt queue 56. The state of the corresponding application may also be marked as ready to run in the overt application list. The input handler routine 78 then resumes execution to swap back the various data structures as appropriate to revert to the environment existing when the routine 78 was first called.

If the overt environment active window for the input event is the window of the environment manager application, a further determination is made as to whether the input event is a mouse event at 156. If the event is not a mouse event, the input data is added to the covert input queue 76 at 158. Again, in a preferred embodiment, the event is added to the covert queue 76 by swapping, if needed, to the covert environment state, executing the input handler routine 58 to insert the event and set a corresponding application as ready to run, and swapping back, if needed, to the environment existing when the routine 78 was called. Execution then returns to the operating system at 154.

Where the mouse event occurs with the mouse pointer within the window of the environment manager application, both input focus and the designation of the current active window in the overt environment remains or is set to the environment manager application. The mouse event must, however, be further localized within the covert environment root display space to associate the mouse event with a potential change of input focus and at least a cursor position change within the covert environment. Accordingly, a translation routine 162 is executed to convert or map the location of the event within the environment manager application window to the covert root window coordinate system. Thus, the mouse pointer location is translated into view window relative coordinates before the event, including the location of the event representing the logical destination of the event, is added to the covert input queue 76 in the same manner as other covert input events are added at 158. Execution then returns to the operating system at 154.

If the mouse event occurs with the mouse pointer located outside of the environment manager application window, the mouse event is considered an overt environment event. Thus, the mouse event is added to the overt input queue 76 at 152 and execution returns to the operating system at 154.

Finally, events generated by collaborative guests 10' are passed by the operating system to the environment manager application. These events are always considered to be covert environment events. Therefore, these events 96, as shown in FIG. 4, are always added directly to the covert environment queue 76. Again, since the current overt or covert environment execution state is maintained by the environment manager application, the current copy exchanged location of the covert input queue 56, 76 is determinable. A temporary exchange of the data structures may be performed to facilitate use of the input routine 58 to add the event to the covert queue.

The present invention can also be implemented as an intrinsic part of the operating system itself. In an operating system such as MS-Windows '95, the essential aspects of the environment manager application can be implemented directly as part of the corresponding portions of the unaltered operating system, thereby minimizing the need to copy exchange data structures. The overt and covert environment input queues can be resident in the operating system and managed by a comprehensive input handler routine. Twin tree structures and active application identifiers, along with an covert environment window buffer can be allocated and managed directly by the operating system. Alternately, a single input queue could be used, though the operating system routines that determine the application for which an event is destined would need to be modified to account for the difference in the overt and covert environment coordinate systems. A single window tree structure could also be used, though again the system routines for walking the tree structure would need to be modified to distinguish between overt and covert environment portions. The covert device driver could be included as a standard part of the operating system or system drivers, since the driver is essentially device independent. Alternately, the function of the covert environment device driver could be modified to selectively operate in line with the conventional display driver. Atomic drawing commands from covert environment applications can be passed to the covert device driver, suitably modified to be covert window relative, and then passed via the jump table 66 to the conventional display device driver. Finally, switching between the overt and covert environments could be provided for as part of the normal operation of the scheduler.

Thus, a system providing for the establishment of two or more environment spaces for the execution of applications within a common operating system has been described. The alternate execution environments provide a convenient and reliable environment for the execution of applications that may be share among collaborative hosts. The resulting collaborative sessions, by isolation in alternate execution environments, facilitate the execution of both private and shared applications on each collaborative host in a reliable and predictable manner.

Based on the foregoing disclosure of the preferred embodiments of the present invention, many modifications and variations of the present invention will be apparent to those skilled in the art. Accordingly, it is to be understood that, within the scope of the appended claims, the present invention may be practiced otherwise than as specifically described above.

What is claimed is:

1. A method of operating a computer system under the control of an operating system that provides for the execution of application programs, said method comprising the steps of:

a) providing a first window list structure to store data defining the logical appearance of a first set of display windows associated with a first set of application programs;

b) providing a second window list structure to store data defining the logical appearance of a second set of display windows associated with a second set of application programs;

c) providing for the drawing of the logical appearance of said first set of display windows in a first display space managed by said operating system by associating, exclusive of said second window list structure, said first window list structure with said operating system during the execution of said first set of application programs; and d) providing for the drawing of the logical appearance of said second set of display windows within a second display space managed by said operating system by associating, exclusive of said first window list structure, said second window list structure with said operating system during the execution of said second set of application programs, and further providing for the transposition of said second display space into a predetermined display window of said first set of display windows.

2. The method of claim 1 wherein said first and second sets of application programs are executed by a host computer system and wherein said method includes the steps of:

a) maintaining the logical appearance of said first set of display windows private to said host computer system, exclusive of said predetermined display window; and b) sharing the logical appearance of said predetermined display window with a guest computer system.

3. The method of claim 2 wherein said first and second sets of application programs are responsive to input events, said method further comprising the steps of:

a) managing input events received for said first and second sets of application programs;

b) identifying, for each event received. an event destination of either said first or second sets of application programs; and c) identifying respective predetermined applications during the respective execution of said first and second sets of applications for receipt of input events having corresponding event destinations.

4. The method of claim 3 wherein said step of managing input events includes managing first and second event queues for events respectively having event destinations within said first and second sets of application programs.

5. The method of claim 4 further comprising the steps of:

a) receiving a predetermined input event;

b) identifying the destination of said predetermined input event as being a predetermined application within either of said first and second sets of applications;

c) storing said predetermined input event in a corresponding one of said first and second event queues; and d) updating said predetermined application to be ready to run.

6. The method of claim 5 further comprising the steps of:

a) determining to execute said predetermined application;

b) selecting a corresponding one of said first and second window list structures for use in connection with the execution of said predetermined application;

c) establishing said operating system to draw within a corresponding one of said first and second display spaces in connection with the execution of said predetermined application.

* * * * *